April 12, 1927.
F. A. BUESCHER
1,624,310
SLIDE TROMBONE
Filed Jan. 21, 1925
2 Sheets-Sheet 1
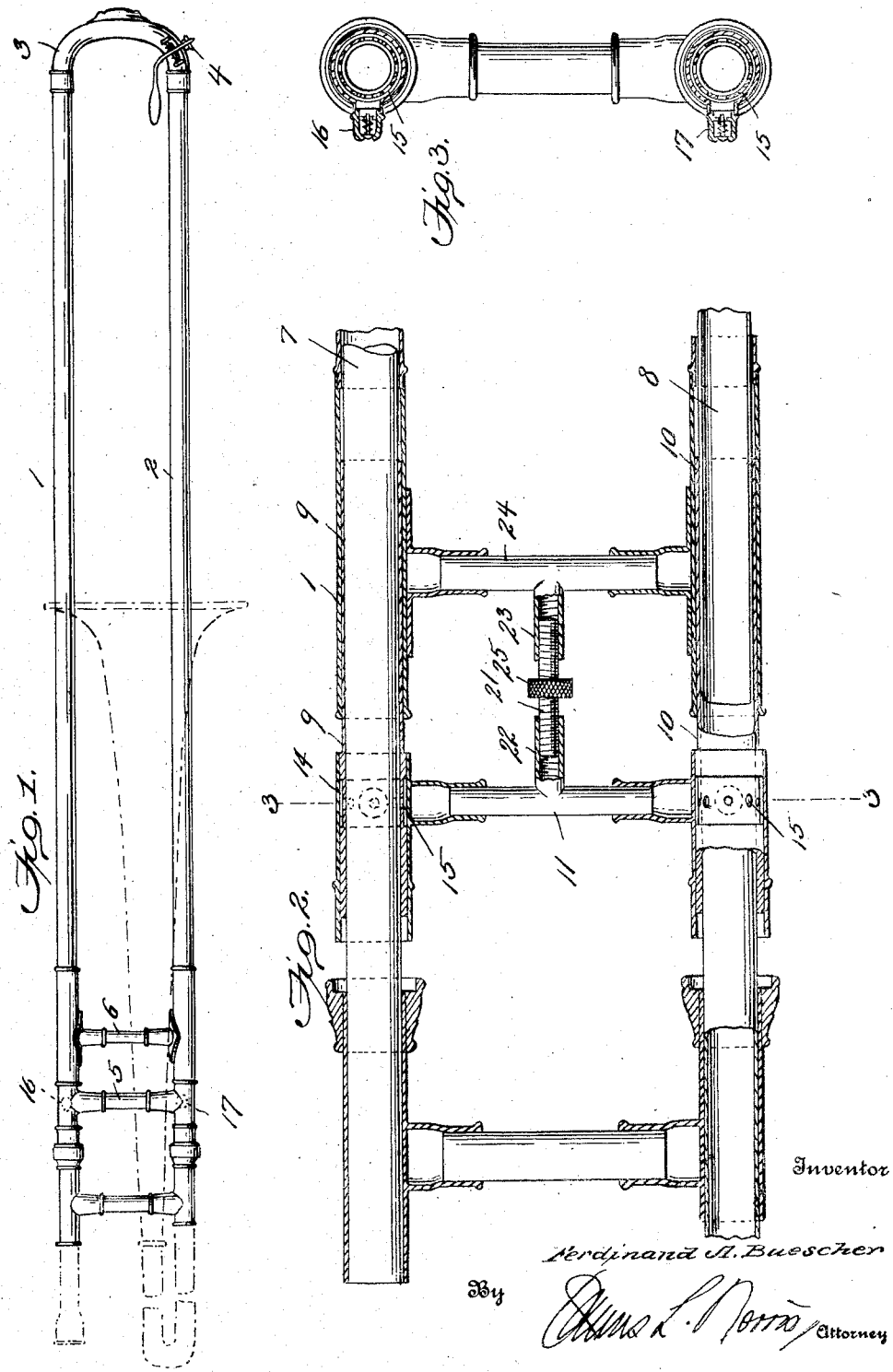
Inventor
Ferdinand A. Buescher
By
Attorney

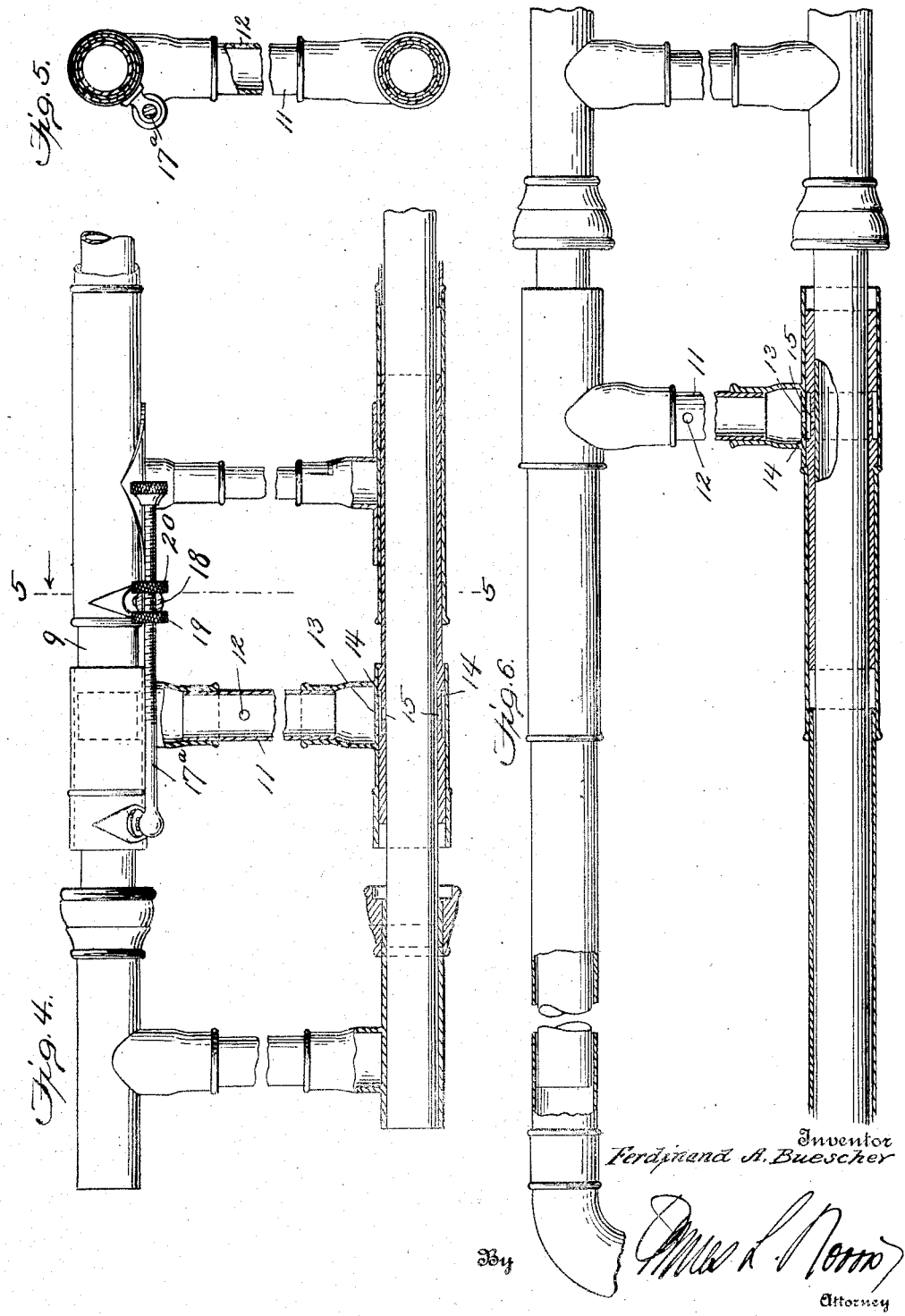

Patented Apr. 12, 1927.

1,624,310

UNITED STATES PATENT OFFICE.

FERDINAND A. BUESCHER, OF ELKHART, INDIANA.

SLIDE TROMBONE.

Application filed January 21, 1925. Serial No. 3,820.

This invention relates to improvements in slide trombones and has for one of its objects the improvement in the balance of the slide whereby a freer movement and better action of the instrument is secured.

Another object of the invention is the provision of means for the substantial immunization of the slide from inoperativeness due to denting of the outer tubes.

A further object of the invention relates to improved means for tuning the slide and means for lubricating the bearings between the tube and pistons.

Other objects of the invention will become apparent as the description of the following illustrative embodiment thereof proceeds.

In the drawings:—

Figure 1 is a side elevation of a slide trombone, those parts shown in full lines being subject to the application of the present invention.

Figure 2 is a longitudinal section through the trombone, parts being broken away, showing certain features of the invention.

Figure 3 is a section taken along the line 3—3 of Figure 2.

Figure 4 is a longitudinal view, partly in elevation and partly in section, parts being broken away showing a modification of the invention.

Figure 5 is a section taken along the line 5—5 of Figure 4.

Figure 6 is a longitudinal view partly in section showing the bearings fixed in the outer tubes without the tuning adjustment.

Referring now in detail to the several figures, the numerals 1 and 2 represent the outer tubes of the slide, joined at their outer ends by the U-shaped tube 3, the latter being provided with the water valve 4. The tubes 1 and 2 are connected adjacent their inner ends by the braces 5 and 6, the unitary structure so far described constituting the slide of the trombone. Said slide operates upon the pistons 7 and 8, the latter telescoping within the tubes 1 and 2 and forming with said tubes an air pipe of variable length. It is essential that a substantially fluid-tight seal be maintained between the pistons and tubes throughout the range of movement of the slide and this is usually accomplished by enlarging the diameter of the pistons for a considerable distance adjacent their inner ends the surfaces of said enlarged portions co-acting with the inner walls of the tubes and constituting bearings which by reason of their length effect the sealing of the joint between said pistons and tubes. The pistons, except at their bearing surfaces are of less diameter than the tubes in which they reciprocate, a slight annular clearance space existing between them.

The walls of the tubes 1 and 2 are made quite thin so as to contribute to the lightness of the slide, and ease in its operation. This renders the tubes easily dented, even when carefully handled. A dent in one of the tubes, no matter how slight, renders the trombone inoperative, for the bearing cannot pass the dented portion and the slide sticks. Or if the damage be so minute as to permit forcing of the bearing past the dented portion, the seal becomes broken and the tone of the instrument impaired.

By the present invention I remove entirely this drawback by omitting altogether the enlarged bearing surfaces or stockings at the ends of the pistons, leaving the pistons of uniform diameter throughout their entire lengths and maintaining between them and the tubes within which they telescope a uniform clearance space. Ordinary denting of the outer tubes will therefore have no effect upon the action of the instrument since the displaced metal is accommodated within said clearance space. An extraordinary denting which may cause the metal of the tubes to press against the pistons merely produces an added friction in the operation of the slide but has no effect upon the seal between the pistons and tubes, therefore the quality of the tone of the instrument remains unimpaired.

In lieu of the enlarged bearing surfaces at the ends of the pistons the present invention provides similar surfaces in the form of constrictions in the internal diameter of the tubes 1 and 2, said constrictions preferably taking the form of sleeves 9 and 10 which are inserted within the inner ends of the tubes 1 and 2 and occupy the clearance space, bearing against the outer surfaces of the pistons. Said sleeves usually make a tight friction fit within the tubes as shown in Figure 6, but when a tuning adjustment is provided for lengthening the air pipe, the sleeves may be slidable relatively both to the outer tubes and pistons. Not only does the disposition of the bearings at the ends of the tubes minimize the chance of the instrument becoming inoperative through denting of the slide but it also improves the balance of the slide, placing the bearings directly above the point of support of the slide so that given angular movement of the hands of the player with respect to the axis of the pistons has less binding effect upon the relatively reciprocating parts than in cases where the bearings are remote from the point of support. Thus a freer movement and a better action of the trombone is secured and the balance of the slide is improved by massing the metal above the point of support.

Trombones of the usual type are lubricated prior to playing the instrument by withdrawing the pistons and applying a few drops of lubricating oil to the stockings.

The transposition of the sleeve, bearings or stockings from the outer ends of the pistons to the inner ends of the slide as done in the present invention lends itself to the improvement of the lubrication facilities. In Figure 4 I have shown one of the braces 11 constituted as an oil reservoir with the filling hole 12, the chamber within said brace communicating with the bearing surfaces between the stockings and pistons by means of apertures formed in the shell 13 which surrounds the stocking or bearing, which apertures in turn communicate with annular grooves 14 formed on the outer faces of the stockings and leading by means of the apertures 15 formed in the stockings to said bearing surfaces. Constant lubrications is thus provided at all times, and particularly while playing, the effect of which is not only to retard the wear of the parts but to improve the seal between the pistons and tubes.

In Figures 1, 2 and 3 I have shown an alternative construction in which the brace 11 is left intact as in ordinary trombone construction, but the stockings are provided with the annular grooves 14 communicating by means of apertures 15 with the bearing surfaces, said annular channels being separately supplied by means of oil cups 16 and 17.

It sometimes happens, from one cause or another that the pitch of the instrument varies with that of other instruments. Played in connection, for instance, with a piano the pitch cannot be changed by the player while playing. At such times it is advantageous to have at hand some means for varying the length of the air pipe so that the proper pitch may be produced when the instrument is being played. The provision of the bearing sleeves 9 and 10 at the inner ends of the outer tubes lend themselves advantogeously to the provision of such tuning means, for if such bearings are made slidable within the outer tubes as shown in Figures 2 and 4 they become, in effect extensible sections of said outer tubes. Any desired means may be employed for adjustably extending said bearings, one of said means being shown in Figure 4 and consisting of a threaded rod 17ª fixed relatively to said bearing and passing through an apertured knob 18 fixed relatively to one of the outer tubes. Knurled nuts 19 and 20 are threaded upon said rod at opposite sides of the knob 18. By loosening one of said nuts the other may be rotated upon the threaded rod and by its abutment against the knob 18 causes either the extension or recession, as the case may be, of the bearings 9 and 10. When the proper position of adjustment has been reached the nuts may be tightened against the knob 18 preventing inadvertent alteration in the adjustment.

Another form of tuning means is shown in Figure 2 in which a right and left hand threaded stem 21 operates in sockets 22 and 23 which are fixed to braces 11 and 24 secured respectively to the sleeves 9 and 10 and outer tubes 1 and 2. A knurled collar 25 on said stem permits the latter to be turned, causing the braces 11 and 24 to approach or recede thereby moving the sleeves 9 and 10 in or out with respect to the tubes.

While I have herein shown and described what I believe to be practical and preferred embodiments of my invention, it is to be understood that various alterations and changes may be made in the arrangement or shape of the various without departing from the scope of the invention as defined in the appended claims.

Having described my invention what I claim as new and desire to secure by Letters Patent, is:—

1. In a trombone, a slide comprising tubes, pistons telescoping within said tubes, bearings for said pistons carried only at the inner ends of said tubes, said bearings being slidable with respect to said tubes and forming extensible sections thereof for varying the length of the air pipe constituted by said tubes.

2. In a trombone, a slide comprising tubes, pistons of the same uniform cross section diameter throughout telescoping within said tubes, these latter having frictionally secured to the inner faces thereof, at their inner terminal portions, lengthwise extending sleeves constituting bearings for the pistons and fluid tight seals between the pistons and tubes.

3. In a trombone, a slide comprising tubes, pistons of the same uniform cross section diameter throughout telescoping within said tubes, these latter having frictionally secured to the inner faces thereof, at their inner terminal portions, lengthwise extending sleeves constituting bearings for the pistons and fluid tight seals between the pistons and tubes, and means for adjusting said sleeves relative to the tubes and pistons for changing the pitch of the instrument.

4. In a trombone, a slide comprising tubes, pistons of the same uniform cross section diameter throughout telescoping within said tubes, these latter having frictionally secured to the inner faces thereof, at their inner terminal portions, lengthwise extending sleeves constituting bearings for the pistons and fluid tight seals between the pistons and tubes, and means carried by the slide for adjusting said sleeves relative to the tubes and pistons for changing the pitch of the instrument.

5. In a trombone, a slide comprising tubes, pistons of the same uniform cross section diameter throughout telescoping within said tubes, these latter having frictionally secured to the inner faces thereof, at their inner terminal portions, lengthwise extending sleeves constituting bearings for the pistons and fluid tight seals between the pistons and tubes, and said sleeves extended from the inner ends of the tubes to increase the length of the slide.

6. In a trombone, a slide comprising tubes, pistons of the same uniform cross section diameter throughout telescoping within said tubes, these latter having frictionally secured to the inner faces thereof, at their inner terminal portions, lengthwise extending sleeves constituting bearings for the pistons and fluid tight seals between the pistons and tubes, said sleeves extended from the inner ends of the tubes to increase the length of the slide, and means carried by the outer ends of the sleeves and connected with the slide for adjusting the sleeves relative to the tubes and pistons for varying the pitch of the instrument.

In testimony whereof I have hereunto set my hand.

FERDINAND A. BUESCHER.